United States Patent [19]

Kain

[11] Patent Number: 5,507,558
[45] Date of Patent: Apr. 16, 1996

[54] AUTO BOOSTER SEAT

[75] Inventor: James M. Kain, Tipp City, Ohio

[73] Assignee: Lisco, Inc., Tampa, Fla.

[21] Appl. No.: 130,205

[22] Filed: Oct. 1, 1993

[51] Int. Cl.⁶ .................................................. A47C 1/08
[52] U.S. Cl. ........................ 297/256.15; 297/250.1; 297/488
[58] Field of Search ............................ 297/250.1, 256.15, 297/256.16, 487, 488

[56] References Cited

U.S. PATENT DOCUMENTS

| | | | |
|---|---|---|---|
| 3,232,665 | 2/1966 | Von Wimmersperg | 297/385 |
| 3,424,497 | 1/1969 | Brilmyer et al. | 297/390 |
| 3,865,433 | 2/1975 | Stafford | 297/390 |
| 3,964,787 | 6/1976 | Labadie et al. | 297/390 |
| 4,033,623 | 7/1977 | Thary et al. | 297/390 |
| 4,155,591 | 5/1979 | Mauron | 297/216 |
| 4,275,923 | 6/1981 | Molnar | 297/250 |
| 4,429,916 | 2/1984 | Hyde et al. | 297/256.15 |
| 4,463,984 | 8/1984 | Molnar | 297/250 |
| 4,502,732 | 3/1985 | Williams | 297/488 |
| 4,568,122 | 2/1986 | Kain | 297/488 |
| 4,579,191 | 4/1986 | Klee et al. | 297/488 X |
| 4,591,208 | 5/1986 | McDonald et al. | 297/487 |
| 4,643,474 | 2/1987 | Wise et al. | 254/250 |
| 4,662,683 | 5/1987 | Knoedler et al. | 297/488 |
| 4,671,574 | 6/1987 | Kassai | 297/487 |
| 4,687,255 | 8/1987 | Klanner et al. | 297/488 |
| 4,765,685 | 8/1988 | Sudoh et al. | 297/488 |
| 4,946,180 | 8/1990 | Baer | 280/39 |
| 4,984,845 | 1/1991 | Knoedler et al. | 297/250 |
| 5,275,464 | 1/1994 | Eichhorn et al. | 297/488 X |

FOREIGN PATENT DOCUMENTS 94318  11/1983  European Pat. Off. ............ 297/250.1

*Primary Examiner*—Laurie K. Cranmer

[57] ABSTRACT

An auto booster seat adapted to be positioned on the seat of a vehicle to support a child and for functioning in cooperation with a conventional seat belt to secure the child and auto booster seat with respect to the seat of a car in the event of an accident or sudden acceleration or deceleration. The auto booster seat comprises a seating shell in a generally rectangular configuration and has parallel side edges and parallel front and rear edges, a lower surface positionable on the seat of the vehicle and an upper surface having a pad for receipt of a child sitting thereon. The seating shell has projections extending upwardly from the upper surface along the side edges. Each projection has a forward extent adjacent to the front edge and a rearward extent adjacent to the rear edge. A generally U-shaped cutout is formed into each projection with upwardly directed front and rear parallel surfaces. The front and rear surfaces extend from the forward extent of the projections and angle downwardly toward the rearward extent. A guide pin is formed in each front surface and each rear surface with the guide pins of each projection being in axial alignment with each other at about 90 degrees from the surface.

6 Claims, 4 Drawing Sheets

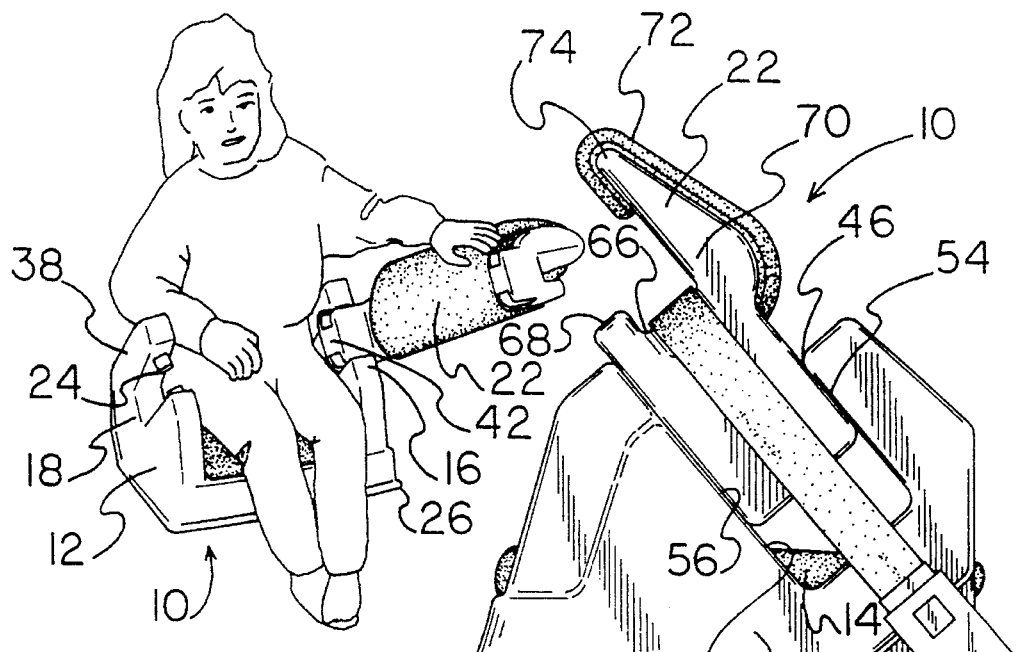
FIG. 7
FIG. 8
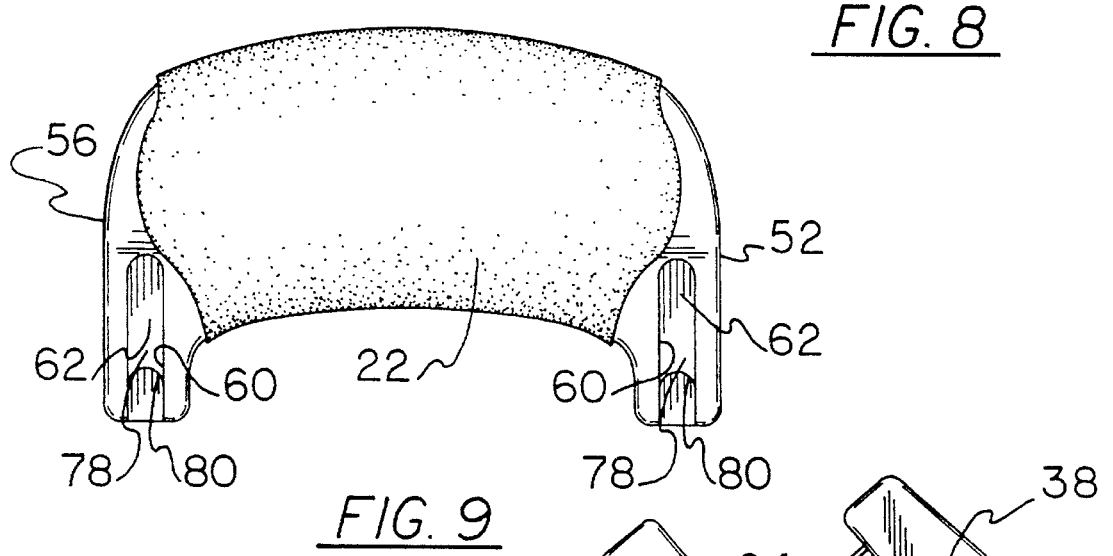
FIG. 9
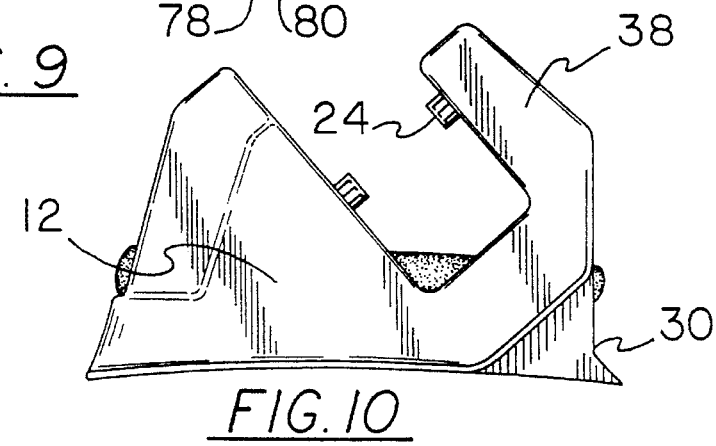
FIG. 10

AUTO BOOSTER SEAT

BACKGROUND OF THE INVENTION

1. Field of the Invention

This invention relates to an auto booster seat and, more particularly, to a booster seat for a child having a seat shell, a shield slidably received thereby and resilient means urging the shield upwardly against the force of a car seat which tends to urge the shield downwardly.

2. Description of the Background Art

Many types of child car seats and booster seats are in wide use today throughout the automotive and child care industries. Auto booster seats are specifically designed for use by a child older and larger than an infant, hence, for example, 40 to 60 pounds, and are simply intended to raise the elevation of a child so he or she is not simply looking at the back of the front seat. Booster seats are designed for the convenience and safety of the child, the convenience of the parents, all within the framework of increased safety.

A large number of auto booster seats exist in the prior art. Auto booster seats of multipiece construction are disclosed in U.S. Pat. No. 3,964,787 to Labadie; U.S. Pat. No. 4,155, 591 to Mauron; U.S. Pat. No. 4,568,122 to Kain; U.S. Pat. No. 4,591,208 to McDonald; U.S. Pat. No. 4,643,474 to Wise; 4,671,574 to Kassai; 4,687,255 to Klanner; 4,765,685 to Sudoh; and 4,984,845 to Knoedler. Although each of these prior art patents advanced the state of the art to one extent or another, none provides the magnitude of increased safety and convenience with reduced cost of that associated with the present invention.

Additional child car seat are disclosed in U.S. Pat. Nos. 4,275,923 and 4,463,984, both to Molnar and both of a one-piece construction. Utility of such one-piece car seats are limited particularly if a one-piece lap belt is the only available coupling with the seat of the automobile.

Additional patents of interest included U.S. Pat. Nos. 4,033,623 to Thary; 4,502,732 to Williams; and 4,946,180 to Bear. The Thary patent relates to a safety restraint positionable in front of a child. The Williams device features a one-piece component positionable over the lap of a child for warppable interrelationship with a lap-type seat belt. Lastly, the Bear reference discloses a child support for use as a safety car seat stroller, high chair, crib or the like.

No prior art auto booster seat, however, has the capability to restrain a child over a wide variety of child sizes, features maximum safety for the child seated therein, has maximum convenience of use for the parent and can be used with either a simple lap seat belt or a three-point car seat as does the present invention.

Accordingly, it is an object of the present invention to provide an improved auto booster seat adapted to support a child in the seat of a vehicle for functioning in cooperation with a conventional seat belt to secure the child and auto booster seat with respect to the seat of a vehicle in the event of an accident or sudden acceleration or deceleration, the auto booster seat comprising a seating shell in a generally rectangular configuration having side edges and front and rear edges and having a lower surface positionable on the seat of the vehicle and an upper surface for receipt of a child sitting thereon, the seating shell having projections extending upwardly adjacent to the side edges, each projection having a forward extent adjacent to the front edge and a rearward extent adjacent to the rear edge, a cutout formed into each projection and upwardly directed front and rear surfaces, the front and rear surfaces extending from the forward extent of the projections and angled downwardly toward the rearward extent, and a guide pin formed in each front surface and rearsurface in axial alignment; a shield adjustably positioned within the cutouts of the shell and having a rectangular body with lateral edges, each lateral edge, including an upper surface in sliding contact with a rear surface and with a lower surface in sliding contact with a front surface, each upper and lower surface having a slot with a reciprocating plunger therein adapted to releasably receive a guide pin for slidable coupling of the shield with respect to the seating shell; and wherein the shell has an upper surface with a forward and a rearward flange extending between the lateral edges with a curved bearing surface therebetween to receive a car seat belt for holding the shell downwardly; and resilient means within the shield to resiliently urge the shield upwardly with respect to the seating shell.

A further object of the present invention is to maximize the safety of a child riding in a car seat.

A further object of the present invention is to render the child car seat convenient for the parent when placing the child in a car seat and securing the child thereto through a seat belt.

A further object of the present invention is to provide versatility to an auto booster seat whereby it may be used with either a two-piece or a three-piece seat belt.

A further object of the invention is to utilize a child booster seat either with or without an associated safety shield.

A further object of the present invention is to reduce the cost and parts of an auto booster seat while maximizing their safety and convenience.

These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention may be incorporated into an auto booster seat adapted to support a child in the seat of a chair for functioning in cooperation with a conventional seat belt to secure the child and auto booster seat with respect to the seat of a car in the event of an accident or sudden acceleration or deceleration, the auto booster seat comprising a seating shell in a generally rectangular configuration having parallel side edges and parallel front and rear edges and having a lower surface positionable on the seat of the car and an upper surface having a pad for receipt of a child sitting thereon, the seating shell having projections extending upwardly from the upper surface along the side edges, each projection having a forward extent adjacent to the front edge and a rearward extent adjacent to the rear edge, a generally U-shaped cutout formed into each projection with upwardly directed front and rear parallel surfaces, the front and rear surfaces extending from the forward extent of the projections and angled downwardly toward the rearward extent, axial alignment, and a guide pin formed in each front surface and rear surface at about 90 degrees from the planes of the surfaces a safety shield adjustably positioned within the cutouts of the shell and having a rectangular body with lateral edges, each lateral edge including an upper surface in sliding contact a rear surface and with a lower surface in sliding contact with a front surface, each upper surface and each lower surface having a slot with a reciprocable plunger therein adapted to releasably couple to a guide pin for slidable coupling of the shield with respect to the seating shell, the shield having an upper surface between the lateral edges with a forward flange and a rearward flange with a curved bearing surface therebetween to receive a car seat belt for holding the shield downwardly, the shield also having an impact surface extending upwardly as an extension of a rearward flange with a cushion thereon providing a sloped surface for precluding injury to a child in the car seat in the event of a sudden forward movement of the child; and resilient means within the shield to resiliently urge the shield upwardly with respect to the seating shell as a function of the size of the child supported thereon, the resilient means including the plungers slidably received in the slots of the lateral edges to adjustably cover portions of the slots, each plunger having extensions for releasably attaching to an associated pin while allowing limited rotation therebetween. The resilient means also including springs to resiliently urge the plates in a direction to raise the shield with respect to the seating shell.

The foregoing has outlined rather broadly, the more pertinent and important features of the present invention. The detailed description of the invention that follows is offered so that the present contribution to the art may be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other methods and structures for carrying out the same purposes of the present invention. It should also be realized by those skilled in the art that such equivalent methods and structures do not depart from the spirit and scope of the invention as set forth in the appended claims.

BRIEF DESCRIPTION OF THE DRAWINGS

For a more succinct understanding of the nature and objects of the invention, reference should be directed to the following description taken in conjunction with the accompanying drawings in which:

FIG. 7 is a perspective illustration of the device of the prior Figures with a child seated therein.

FIG. 8 is a side elevational view of the device of the prior Figures being held in place by a seat belt.

FIG. 9 is a rear elevational view of the shield of the device of the prior Figures.

FIG. 10 is a side elevational view of the base of the device of the prior Figures.

Similar reference numerals refer to similar parts throughout the several Figures.

DETAILED DESCRIPTION OF THE PREFERRED EMBODIMENTS

Figure 1:
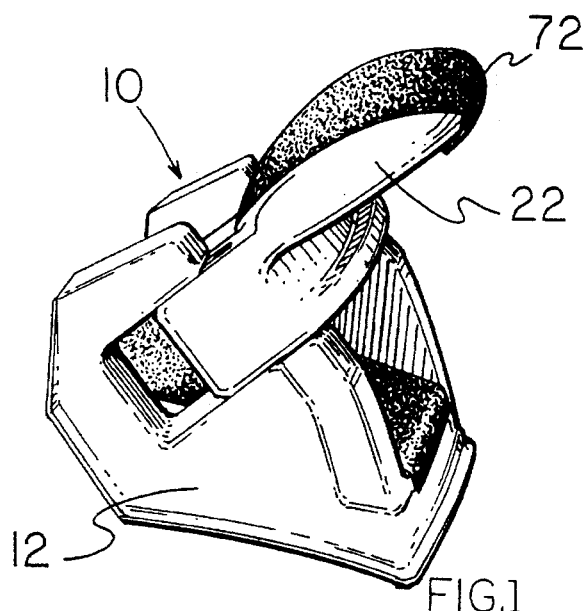
FIG. 1 is a perspective illustration of an auto booster seat constructed in accordance with the principles of the present invention.
Figure 2:
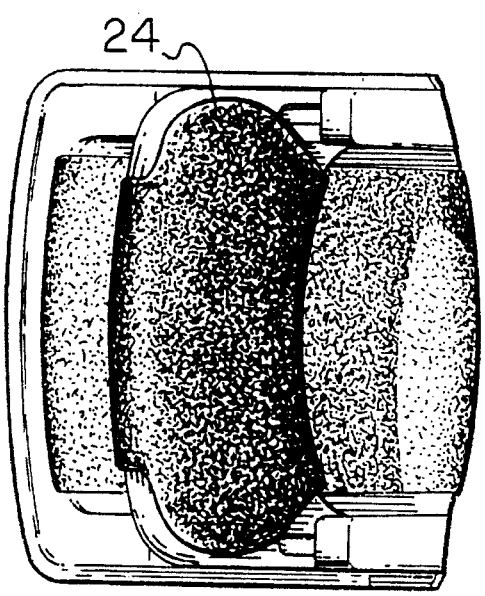
FIG. 2 is top plan view of the device of FIG. 1.
Figure 5:
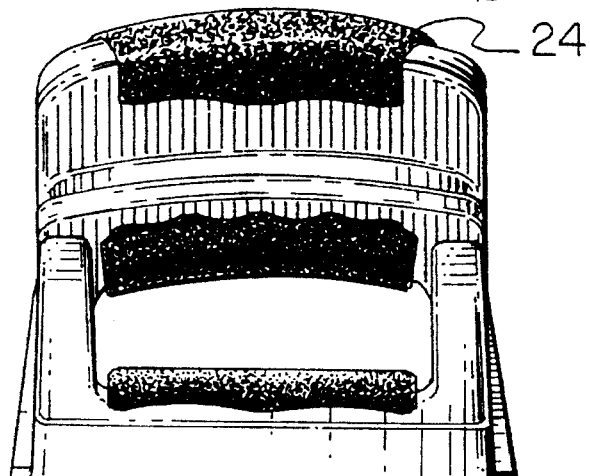
FIGS. 3, 5 and 6 are side, front and rear elevational views of the device of the prior Figures.
Figure 3:
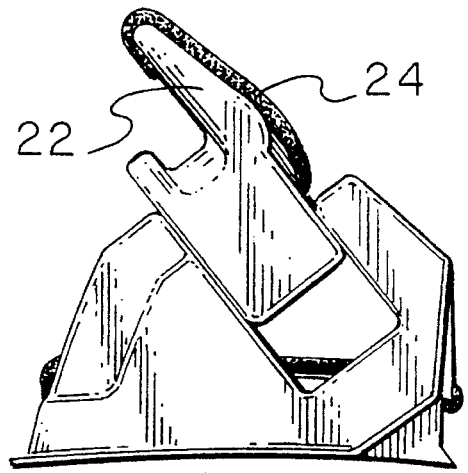
Figure 6:
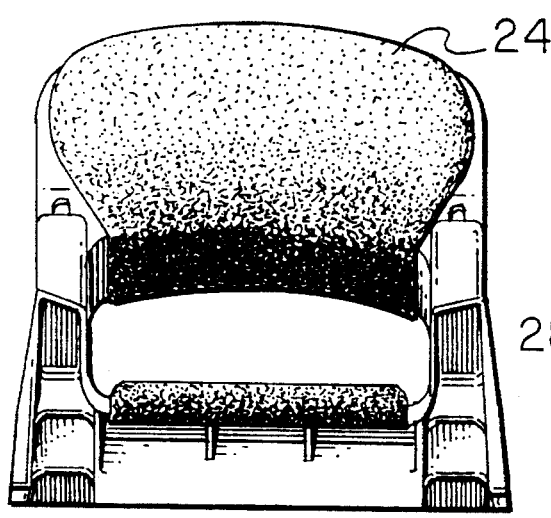
Figure 4:
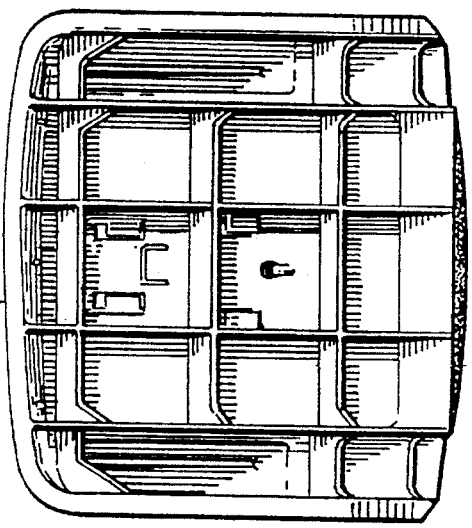
FIG. 4 is a bottom view of the device of the prior Figures.
Figure 11:
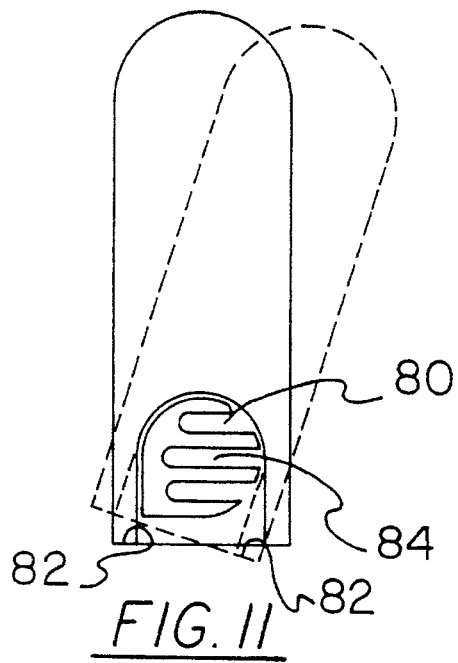
FIG. 11 is a front elevational view of the pin and associate support of the prior Figures.
Figure 12:
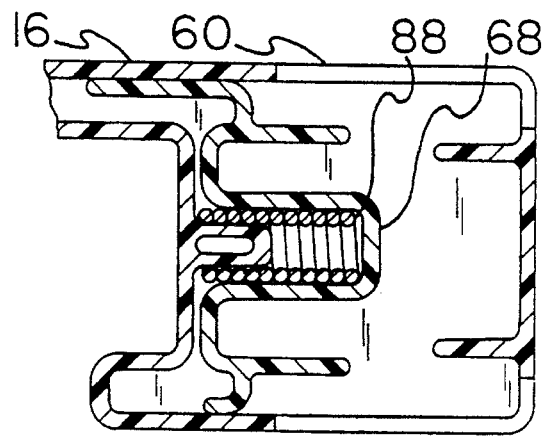
FIGS. 12 and 13 are sectional views of the support for receiving the pins of the prior Figures.
Figure 13:
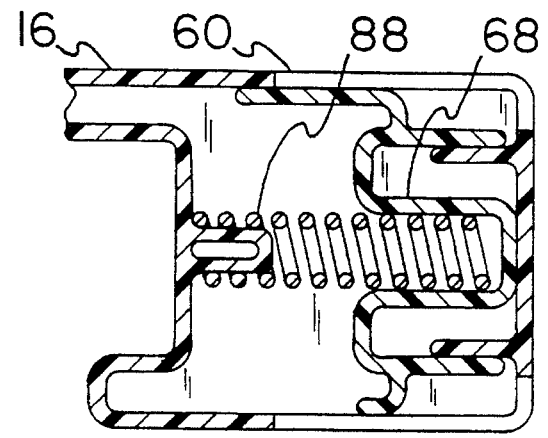

Shown in the Figures, with a particular reference to FIG. 7, there is shown an auto booster seat 10 with a child therein. The auto booster seat is adapted for use by a child in the 40 to 60 pound range. In its broadest context, it is comprised of a shell 12 having a raised seating surface 14 with elevated left and right hand projections 16 and 18. The seating surface has no front or back.

There is an automatically adjustable shield 22 riding on molded-pins 24 which are molded as part of the seat shell 12. The shield 22 is spring loaded towards its uppermost position. A seat belt moves the shield 22 downwardly and rearwardly on a specific angle which coincides with the anthropometry data of the different sizes and weights of the children who are targeted for the product. An automobile belt goes across the front of the shield. As the parent tightens the vehicle lap belt, the shield will automatically adjust down and back onto the child's legs, abdomen and lower body to effectively restrain the child in the event of an accident or sudden deceleration. The ability of the shield to raise and lower as the size of the child changes allows the other portion of the shield to effectively drop with the size of the smaller child. This dramatically reduces the probability of head impact with the shield. Restraint of the child occupant is provided through torso engagement with the shield regardless of the size of the child.

The shield pivots and hinges to the left or to the right for easy entry or exit. The shield can also be removed and the seat can be used as a belt-positioning booster if the automobile in which it is installed has a three-point lap/shoulder belt combination restraint. The lap belt goes across the cutout seat sides and effectively hooks the shoulder portion of the belt beneath a pin to properly position it across a child's upper torso. The method or way in which the spring loaded shield 22 automatically adjusts down and back onto the booster seat occupant adds an important benefit of safety for the user. The more one tightens the auto lap belt, the tighter the shield becomes on the seated occupant similar to how an adult would snug up the adult lap/shoulder belt to securely fasten themselves in position. This arrangement minimizes the misuse problem that is present with all child restraint systems known to date.

With greater particularity to the structure as shown in the various Figures, the system is composed of two major components, a seating shell 12, a shield 22, and coupling mechanisms therebetween.

The seating shell 12 is formed in a generally rectangular configuration. It has generally parallel side edges 26 and generally parallel front and rear edges 28 and 30 therebetween. The rear edge of the shell corresponds with the rear edge of the seat and the front end of the shell extends forwardly toward the front end of the seat. The seat has a lower surface positionable on the seat of the car. It also has an upper seating surface 14. The upper surface 14 is preferably provided with a pad 22 for the comfortable receipt of a child sitting thereon to facilitate his comfort as well as safety.

Extending upwardly from the upper surface along the side edges are edge projections 16 and 18. Each of the edge projections has a forward extent 36 adjacent to the front edge 30 and a rearward extent 38 adjacent to the rear edge of the shell. Formed into each projection is a generally U-shaped cutout 42. Each cutout 42 has a base 44 at the lower extent thereof. Each cutout also includes upwardly directed front and rear surfaces 46 and 48 parallel with each other. The front and rear surfaces extent from the forward extend 36 of the projection at an angle downwardly toward the rearward extend 38. This is an angle of about 45 degrees with respect to the horizontal.

A guide pin 24 is integrally formed into the front molded surfaces extending outwardly a short distance at 90 degrees from the surface in which it is formed. The pins are coaxial in each recess adjacent to the forward extent.

The second major component of the auto booster seat system 10 is the safety shield 22. The shield 22 is a rigid member adjustably positioned within the cutouts 42 of the seating shell 12. It has a generally rectangular body with lateral edges 52. The lateral edges include an upper and lower surface 54 and 56 in sliding contact with the front surfaces 46 and rear surfaces 48 of the seating shell. A slot 60 is formed in each upper and lower surface 54 and 56 to the lateral edges. The slots 60 are each adapted to receive a reciprocable plunger 62 to releasably couple with the guide pins 24 of the seating shell. This establishes a sliding coupling relationship whereby the shield 22 may slide upwardly and downwardly at an angle toward or away from the lap of a child with respect to the fixedly position seating shells 12.

The shield 12 has a curved upper bearing surface 66. Such bearing surface is bounded forwardly and rearwardly by a forward flange 68 and a rearward flange 70. The curved bearing surface 66 is located between the flanges and extends between the lateral edges 52 of the shell in a curved configuration to receive a two-piece lap belt type car seat secured to the seat of the vehicle in which it is utilized. The car seat belt functions to hold the shield downwardly in contact with the lap of the child including lower torso and upper legs for safety purposes during use. This shield 22 is preferably provided with a cushion 72 on its upper surface which is an extension 74 extending upwardly from the rearward flange 70. The cushion provides a soft surface for precluding injury to a child in the seat in the event of an accident or other certain deceleration which would tend to move the child forwardly and quickly and which would injure the child without the use of the cushion.

The last component of the system is the coupling means interconnecting the seating shell 12 and shield 22. The coupling means includes the pins 24 of the seating shell 12 and components within the shield 22 cooperatively associated with the pins. The function of the coupling means is to resiliently urge the shield 22 upwardly and away from the child and away from the seat 14. The resilient force of these components acts against the action of the seat belt which is releasably secured over the shield 22 in bearing surface 66, in this manner, the seat belt may be tightened to lower the shield against the action of the resilient spring as a function of the size of a child on the seat 14 of the shell 12.

The coupling means includes a plunger 68 slidably received in each slot 60. Each plunger 68 has a surface 78 tending to cover at least a portion of a slot 60. Each plunger also has a curved bearing surface 80 and opposed projection 82 for rotatably and releasably receiving an associated pin 24. Axial slots 84 are formed in each pin 24 to facilitate this coupling relationship. A coil spring 88 is located adjacent to each slot for urging the plunger in a direction so as to resilient urge the plunger and shield upwardly, raised with respect to the seating shell. This direction is against the action of the seat belt which functions for securing the child in position snugly regardless of the conditions of driving.

It is preferred that the entire system including seating shell and shield be constructed of a high impact plastic such as polyurethane, polyethylene or the like, so as to preclude shattering and injury to the child or others in the car in the event of an accident.

Figure 14:
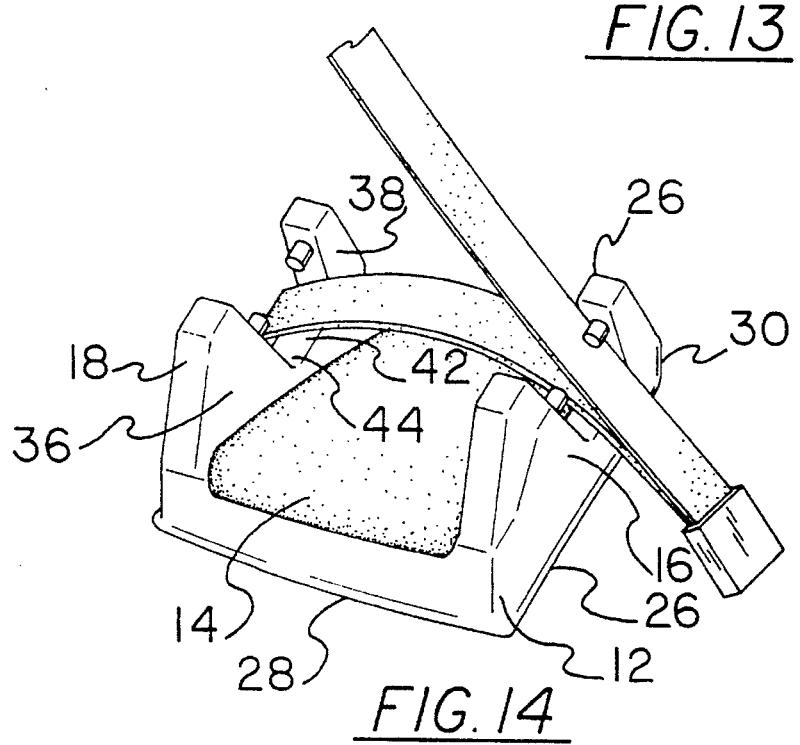
FIG. 14 is a perspective view of the base of the prior Figures being held in position by a three-point seat belt.
Figure 15:
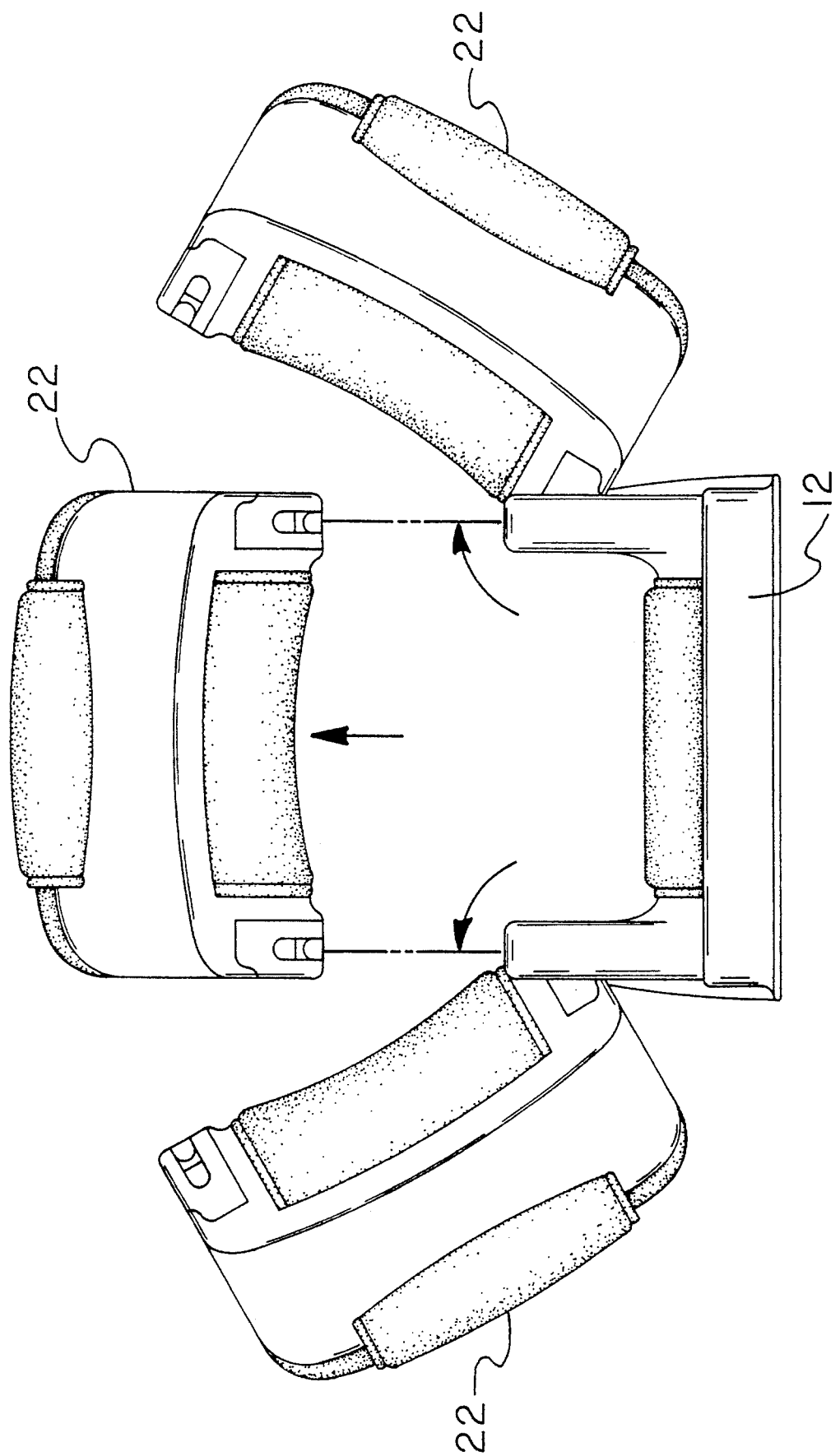
FIG. 15 is an exploded front view illustrating three ways of uncoupling the shield from the base.

Note is taken that the seating shell has utility by itself when used, for example, in association with the car having a three-point lap/shoulder harness. In such situations the child is positioned in the seat 14 of the shell 12 without the shield 22 used in association therewith. The three-point seat belt is then pulled around in the normal fashion that an adult would use it. In this situation, however, the child does not provide a sufficiently large surface for contacting the straps of the seat belt. As a result, a small child using a three-point seat belt could have the upper strap moved to the neck of the child to prevent injury. This can be avoided by the simple use of the seating shell of the present invention which will raise the child so that the belts will all become more effective but, in addition, the U-shaped cut out or recess 42 formed by the side projections 16 and 18 of the seating shell with its molded in pin 24 will constitute a restraint or guide to preclude inadvertent raising of the upper belt to a location adjacent to the child's neck. As such, greater contact between the belt and child will be insured and the child will be held with greater safety because the adjacent edges of the recess of the seating shell limiting movement of the seat belt in the event of an accident or sudden deceleration. Note FIG. 14.

A last feature of utility involves the construction of the safety shield in the region where the plungers 62 receive the pins 24. The upper extends of the pins are bounded by a bearing surface 80 formed as part of each plunger plate 62. The opposed region of each pin is bounded by small resilient projections 82. The projections are adapted to spring outwardly when the shield and projections are lifted upwardly. As such the shield 22 may be lifted upwardly by its center for total removal of the shield 22 from the shell 12. If, however, the shield 22 is lifted from one lateral edge, it will release from the associated pins 24 and the shield will pivot about the other pins. This allows the shield to pivot from one side and its coaxial pins or the other at the discretion of the user for greater convenience in removing or securing a child with respect to the system.

The present disclosure includes that contained in the appended claims as well as that of the foregoing description. Although this invention has been described in its preferred form with a certain degree of particularity, it should be understood that the present disclosure of the preferred form has been made only by way of example and that numerous changes in the details of construction and combination and arrangement of parts may be resorted to without departing from the spirit and scope of the invention.

Now that the invention has been described,
What is claimed is:

1. An auto booster seat adapted to support a child in the seat of a chair for functioning in cooperation with a conventional seat belt to secure the child and auto booster seat with respect to the seat of a car in the event of an accident or sudden acceleration or deceleration, the auto booster seat comprising, in combination:

a seating shell in a generally rectangular configuration having parallel side edges and parallel front and rear edges and having a lower surface positionable on the seat of the car and an upper surface having a pad for receipt of a child sitting thereon, the seating shell having projections extending upwardly from the upper surface along the side edges, each projection having a forward extent adjacent to the front edge and a rearward extent adjacent to the rear edge, a generally U-shaped cutout formed into each projection with upwardly directed front and rear parallel surfaces, the front and rear surfaces extending from the forward extent of the projections and angled downwardly toward the rearward extent and a guide pin formed in each front surface and rear surface providing an axially aligned pair of guide pins on each side of the seating shell, the guide pins being in axial alignment at about 90 degrees from the planes of the front and rear surfaces;

a safety shield adjustably positioned within the cutouts of the shell and having a rectangular body with lateral edges, each lateral edge including an upper surface in sliding contact with a rear surface and each lateral edge including a lower surface in sliding contact with a front surface, each upper surface and each lower surface of the lateral edges having a slot with a reciprocable plunger therein adapted to releasably couple to the guide pins for slidable coupling of the shield with respect to the seating shell, the shield having an upper surface between the lateral edges with a forward flange and a rearward flange with a curved bearing surface therebetween to receive a car seat belt for holding the shield downwardly, the shield also having an impact surface extending upwardly as an extension of the rearward flange with a cushion thereon providing a sloped surface for precluding injury to a child in the car seat in the event of a sudden forward movement of the child; and resilient means within the shield to resiliently urge the shield upwardly with respect to the seating shell as a function of the size of the child supported thereon, the resilient means coupled to the plungers and slidably received in the slots of the lateral edges of the shield to adjustably cover portions of the slots, each plunger having extensions for releasably attaching to an associated pin while allowing limited rotation therebetween, the resilient means also including springs to resiliently urge the plungers in a direction to raise the shield with respect to the seating shell.

2. An auto booster seat adapted to be positioned on the seat of a vehicle to support a child and for functioning in cooperation with a conventional seat belt to secure the child and auto booster seat with respect to the seat of a car in the event of an accident or sudden acceleration or deceleration, the auto booster seat comprising a seating shell in a generally rectangular configuration having parallel side edges and parallel front and rear edges and having a lower surface positionable on the seat of the vehicle and an upper surface having a pad for receipt of a child sitting thereon, the seating shell having projections extending upwardly from the upper surface along the side edges, each projection having a forward extent adjacent to the front edge and a rearward extent adjacent to the rear edge, a generally U-shaped cutout formed into each projection with upwardly directed front and rear parallel surfaces, the front and rear surfaces extending from the forward extent of the projections and angled downwardly toward the rearward extent, and a guide pin formed in each front surface and each rear surface with the guide pins of each projection being in axial alignment with each other at about 90 degrees from the surface.

3. An auto booster seat adapted to be positioned on the seat of a vehicle to support a child and for functioning in cooperation with a conventional seat belt to secure the child and auto booster seat with respect to the seat of a vehicle in the event of an accident or sudden acceleration or deceleration, the auto booster seat comprising:

a seating shell in a generally rectangular configuration having side edges and front and rear edges and having a lower surface positionable on the seat of the vehicle and an upper surface for receipt of a child sitting thereon, the seating shell having projections extending upwardly adjacent to the side edges, each projection having a forward extent adjacent to the front edge and a rearward extent adjacent to the rear edge, a cutout formed into each projection with each projection having upwardly directed front and rear surfaces, the front and rear surfaces extending from the forward extent of the projections and angled downwardly toward the rearward extent, and a guide pin formed in each front surface and rear surface with the guide pins of each projection being in axial alignment with each other;

a shield adjustably positioned within the cutouts of the shell and having a rectangular body with lateral edges, each lateral edge, including an upper surface in sliding contact with a rear surface and with a lower surface in sliding contact with a front surface, each upper and lower surface having a slot with a reciprocating plunger therein adapted to releasably receive a guide pin for slidable coupling of the shield with respect to the seating shell;

wherein the shell has an upper surface with a forward and a rearward flange extending between the lateral edges with a curved bearing surface therebetween to receive a car seat belt for holding the shell downwardly; and resilient means within the shield to resiliently urge the shield upwardly with respect to the seating shell.

4. The apparatus as set forth in claim 3 wherein the plungers are pivotably secured with respect to the pins.

5. The apparatus as set forth in claim 4 wherein the plungers are releasably secured with respect to the pins whereby either lateral edge may be separated from its associated pins for separating the shield from the shell by pivoting in either direction.

6. The apparatus as set forth in claim 5 wherein the rearward flange extends upwardly and includes a cushion for protecting a child in the car seat.

* * * * *